United States Patent
Glezerman

(10) Patent No.: US 7,409,234 B2
(45) Date of Patent: Aug. 5, 2008

(54) WIRELESS COMMUNICATION HEADSET WITH EXCHANGEABLE ATTACHMENTS

(75) Inventor: Abraham Glezerman, Tel-Aviv (IL)

(73) Assignee: Cardo Systems, Inc., Pittsburgh, PA (US)

(*) Notice: Subject to any disclaimer, the term of this patent is extended or adjusted under 35 U.S.C. 154(b) by 477 days.

(21) Appl. No.: 10/605,667

(22) Filed: Oct. 16, 2003

(65) Prior Publication Data

US 2004/0132509 A1 Jul. 8, 2004

(51) Int. Cl.
*H04M 1/00* (2006.01)

(52) U.S. Cl. .............. 455/569.1; 455/569.2; 455/575.2; 381/366; 381/361; 381/367; 381/380; 381/376

(58) Field of Classification Search .............. 455/575.2, 455/575.1, 569.1, 569.2; 381/381, 430, 336, 381/366, 361, 367, 364, 380, 376, 374; 379/330
See application file for complete search history.

(56) References Cited

U.S. PATENT DOCUMENTS

| | | | |
|---|---|---|---|
| 3,588,384 A | 6/1971 | Negley | |
| 3,809,829 A | 5/1974 | Vignini et al. | |
| 4,893,344 A * | 1/1990 | Tragardh et al. | 381/381 |
| D318,283 S * | 7/1991 | Cleveland | D16/123 |
| 5,159,639 A | 10/1992 | Shannon et al. | |
| 5,335,285 A * | 8/1994 | Gluz | 381/381 |
| 5,367,345 A | 11/1994 | da Silva | |
| 5,450,496 A * | 9/1995 | Burris et al. | 381/375 |
| 5,608,808 A | 3/1997 | da Silva | |
| 5,613,222 A | 3/1997 | Guenter | |
| 5,634,201 A | 5/1997 | Mooring | |
| 5,668,867 A | 9/1997 | Nagai | |
| 5,737,436 A * | 4/1998 | Boyden | 381/385 |
| 5,978,689 A | 11/1999 | Tuoriniemi et al. | |
| 5,988,812 A * | 11/1999 | Wingate | 351/158 |
| 6,012,812 A | 1/2000 | Rickards | |
| 6,091,832 A | 7/2000 | Shurman et al. | |
| 6,233,344 B1 | 5/2001 | Clegg et al. | |
| 6,490,362 B1 | 12/2002 | Clegg et al. | |
| 6,510,325 B1 | 1/2003 | Mack et al. | |
| 6,567,651 B2 | 5/2003 | Whitley | |
| 6,868,284 B2 * | 3/2005 | Bae | 455/575.2 |
| 2002/0098877 A1 * | 7/2002 | Glezerman | 455/568 |

(Continued)

FOREIGN PATENT DOCUMENTS

DE 19715321 C2 10/1999

(Continued)

*Primary Examiner*—Vincent P. Harper
*Assistant Examiner*—Khai M Nguyen
(74) *Attorney, Agent, or Firm*—Leason Ellis LLP

(57) ABSTRACT

A communications headset for use with a wireless telephone comprises a mount and a first and second attachment shaped to secure itself to the mount, wherein the first attachment is configured to secure itself around the ear of a user and wherein the second attachment includes a top portion to secure itself to the frame of a pair of glasses worn by the user. Optionally, the mount includes a slot formed through the housing of the communication headset and the first and second attachments include a downwardly dependent leg shaped and sized for receipt in the slot. Also optionally, the mount and the first and second attachment are secured to one another using a magnet attached to either of the housing or the attachments.

13 Claims, 7 Drawing Sheets

U.S. PATENT DOCUMENTS

| | | | |
|---|---|---|---|
| 2003/0003969 A1* | 1/2003 | Tong et al. | 455/568 |
| 2003/0114201 A1* | 6/2003 | Chung et al. | 455/568 |
| 2004/0037444 A1* | 2/2004 | Redmer et al. | 381/370 |
| 2004/0048640 A1* | 3/2004 | Bae | 455/575.2 |

FOREIGN PATENT DOCUMENTS

| | | | |
|---|---|---|---|
| EP | 0840465 | A2 | 5/1998 |
| EP | 0887987 | A2 | 12/1998 |
| EP | 1049310 | A1 | 11/2000 |
| EP | 1049310 | A1 * | 11/2000 |
| EP | 0887987 | A3 | 10/2001 |

* cited by examiner

WIRELESS COMMUNICATION HEADSET WITH EXCHANGEABLE ATTACHMENTS

FIELD OF THE INVENTION

The present invention relates to headsets for communication devices, and, more particularly, improvements in wireless headsets for use with cellular telephones and like devices.

BACKGROUND OF THE INVENTION

In recent years, there has been a proliferation in the use of cellular telephones. As the frequency of use of these phones has expanded, a need has arisen to ensure that the phones are more user-friendly. One problem which has repeatedly been noted is the difficulty for a user to comfortably conduct a conversation, particularly a long conversation, while holding a cellular telephone in close proximity to the user's mouth and ear. This has traditionally been necessary in order for a microphone in the phone to receive the user's voice so that it can be transmitted and for the user to be able to hear the other conversant's voice through a speaker contained in the phone. Holding a phone for long periods of time near the user's head is difficult, particularly when walking, tiring and uncomfortable.

Recent trends have motivated the use of headsets with cellular phones by many users. Since their inception, potential health concerns have arisen over the use of cellular phones in close proximity to a user's head as a result of radiation exposure. While no determinations as to possible health impact have been conclusively made, it has previously been determined that one way in which radiation impact can be minimized is through the use of a cellular phone in conjunction with a headset. As cellular use has increased, concerns over radiation and the desire to minimize potential radiation exposure through the use of headsets have also increased. By using a headset, the cellular phone can be maintained away from a user's head while in use.

Also, as the frequency and duration of cellular use has expanded in recent years, issues of comfort have become more important. By eliminating the need to hold a phone for long periods of time in an uncomfortable position near the user's ear and mouth, the use of a headset with a cellular phone also helps minimize user discomfort. Additionally, recent legislative efforts to prohibit cellular phone use while driving without the use of headset have also greatly increased the use of cellular headsets.

The use of hands-free headsets with both cellular phones and traditional land-line phones dates back many years. One major problem with traditional headsets are the wires which connect the headset to the phone. With regard to their use with land-line phones, such corded headsets are inconvenient because they limit the ability of a user to move around relative to the phone base and tend to become tangled as the headset is used. Moreover, the dangling cord is often found to be an annoyance to the headset user. With regard to their use with cellular phones, corded headsets similarly may become tangled and are annoying to the user. Traditional headsets have also often been bulky, heavy, uncomfortable to wear, unattractive, and inconvenient to use.

Recent developments and implementation of Bluetooth™ technology have facilitated the development of wireless devices, including the development of wireless headsets for use with cellular and land-line phones. By using wireless technology, the need for a cord to connect the headset and the phone is eliminated. Despite the advantages offered by such wireless headsets, there still remains a need in the art for an improved communications headset that is lightweight, attractively designed, comfortable and inconspicuous to wear. There is a further need for a headset that offers versatility to a user utilizing the headset through a variety of attachment and mounting possibilities such that a user can quickly and easily move from one mode of attachment to another. The present invention satisfies these and other needs.

SUMMARY OF THE INVENTION

In accordance with one aspect of the invention, there is provided a lightweight, compact, ergonomic, and attractively designed wireless headset for use with a cellular phone. The housing of the communications headset has a mount with multiple modes of attachment shaped to secure themselves to the mount. Through these different modes of attachment, the headset can be worn comfortably around the ear, by means of an ear-loop, attached to the arms (temples) of a pair of eyeglasses or sunglasses, or otherwise supported in close proximity to a user's ear and mouth. Additionally, the modes of attachment can be quickly and easily adjusted, as well as changed from one mode to another.

In accordance with another aspect of the invention, the mount is a slot formed through the housing of the communications headset and the modes of attachment include a bottom leg portion shaped and sized for receipt within the slot. In accordance with another aspect of the invention, the slot includes one or more constrictions and the legs of the attachments include one or more protuberances such that the interaction between the constrictions and the protuberances secure the attachments from separation from the communication headset housing and allow adjustment of the placement of the attachments relative to the headset. In accordance with yet another aspect of the invention, the bottom leg portions include a lower portion that is transposed slightly relative to an upper portion in order to create friction within the receiving slot to secure the attachments from separation.

In accordance with yet another aspect of the invention, the mount and at least one mode of attachment are secured together using a magnet.

In accordance with yet a further aspect of the invention, a transceiver is provided that attaches to the cellular phone to enable wireless communication with the headset using cellular phones that do not natively support wireless headsets.

In accordance with still another aspect of the invention, a method is provided for wireless communication between a communication headset and a cellular telephone. The method comprises the steps of securing an attachment to a mount on the communication headset, engaging the attachment to either a user's ear or the temple member of a pair of glasses so as to position the communication headset proximate to the user's ear, and communicating through the communications headset. The attachment can be an ear loop or a securement configured to grasp the temple member.

These and other aspects, features, and advantages of the present invention can be understood further with regard to the Drawings and Detailed Description of the Preferred Embodiments.

BRIEF DESCRIPTION OF THE DRAWINGS

FIG. 10a is a detail view of an attachment component.

DETAILED DESCRIPTION OF THE PREFERRED EMBODIMENTS

By way of overview and introduction, the present invention provides an improved communication headset having several modes of attachment that can be quickly and easily secured to the housing of the headset in a variety of ways. Through these different modes of attachment, the headset can be directly and easily secured around a user's ear or attached to the frame of a pair of eyeglass or sunglasses.

Figure 1:
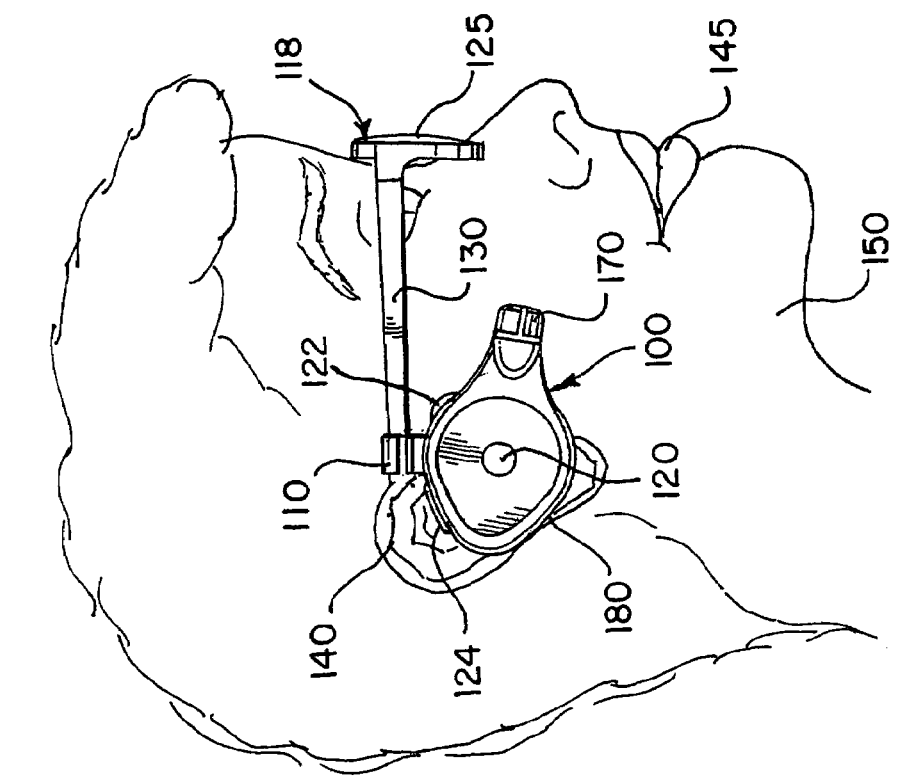
FIG. 1 is a side plan view of one aspect of a communication headset in accordance with the invention and shown with an attachment to the temple member of a pair of glasses of a user.
Figure 4A:
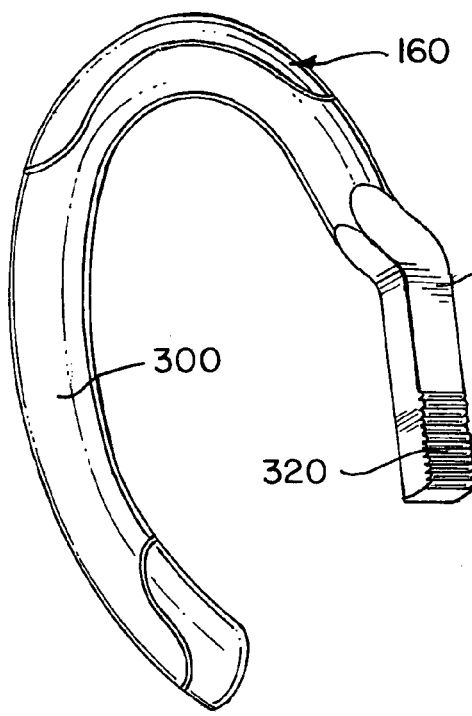
FIG. 4a is an exploded view of a first embodiment of the ear lobe attachment shown in FIG. 2.
Figure 4B:
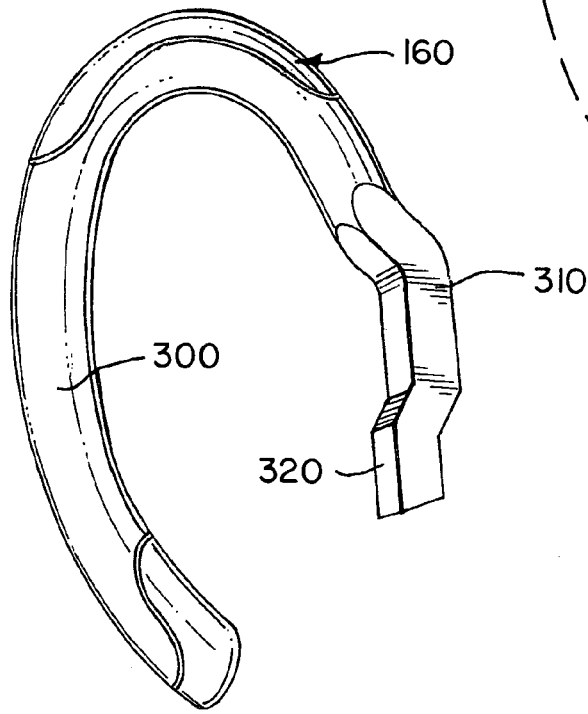
FIG. 4b is an exploded view of a second embodiment of the ear lobe attachment shown in FIG. 2.
Figure 5:
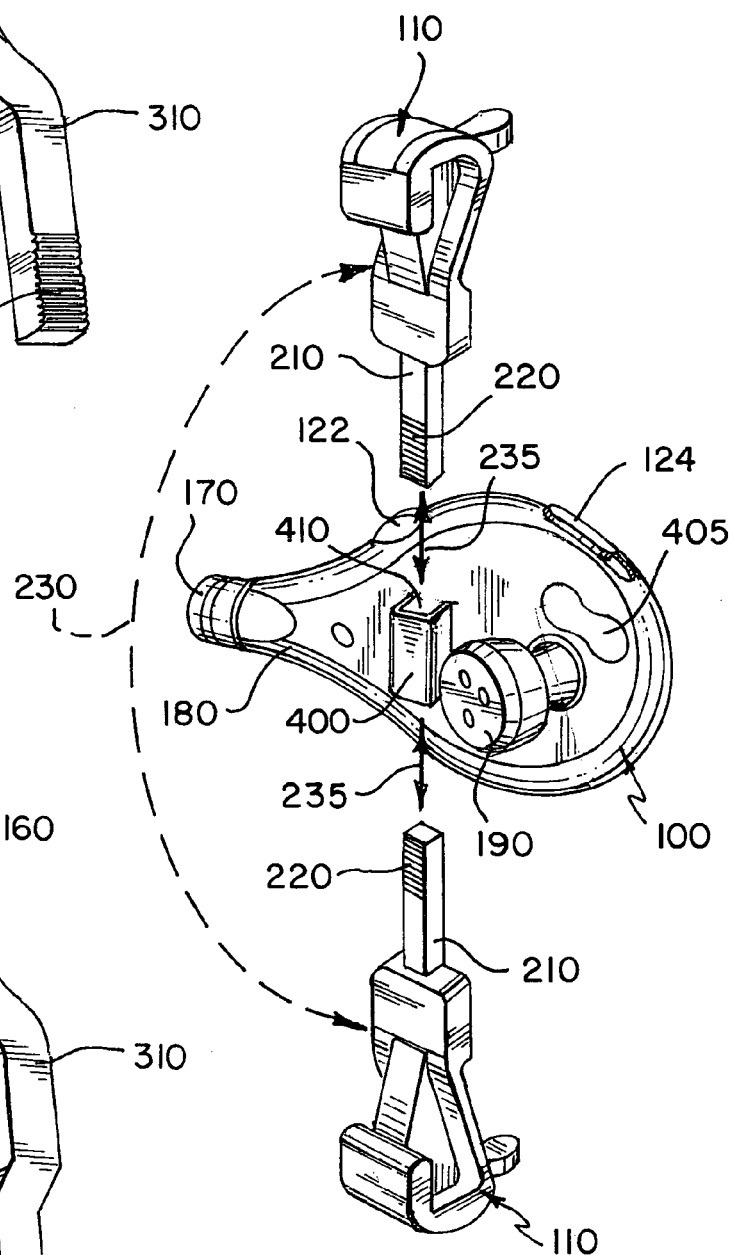
FIG. 5 is a side view illustrating a slot mount according to one aspect of the invention having the eyeglass attachment shown in FIGS. 1 and 3.

With reference now to FIGS. 1, 4 and 5, one aspect of the communication headset 100 is illustrated. The communications headset 100 has a housing 180, a microphone 170, a speaker 190, a socket for a power source 405 (shown while covered by a lid), internal communications circuitry (not shown), and a mount 400. The power source is preferably a rechargeable battery but can also be any of a variety of standard power sources. The communications circuitry receives sound from a user's spoken voice at the microphone 170 and outputs sound from another conversant's spoken voice through the speaker 190 to enable a conversation between a user of the headset 100 and the other conversant over a cellular network.

The communications headset 100 can be used with any cellular telephone 550 (see FIG. 7) and with a conventional cellular service provided by a cellular service provider. Thus, for example, the headset 100 can be used with a cellular telephone employing Bluetooth® or other wireless technology and, in this case, the headset 100 communicates directly with the phone's circuitry. Bluetooth® wireless technology is presently the preferred protocol for wireless communication between the cellular phone 550 and the headset 100. However, it is contemplated that the present invention may be used with a cellular phone employing other methods for wireless communication as well.

Alternatively, the headset 100 can be used with cellular phones that are not equipped with Bluetooth® circuitry, by way of an adapter 700, described below in connection with FIG. 7. For standard cellular phones that are not already Bluetooth® enabled, a separate adapter unit containing charging circuitry and a Bluetooth® chip allows for wireless, hands-free communication with the communications headset 100 of the present invention. The adapter connects to the audio (and optionally other) jack(s) of the cellular telephone such as the battery terminals.

Figure 7:
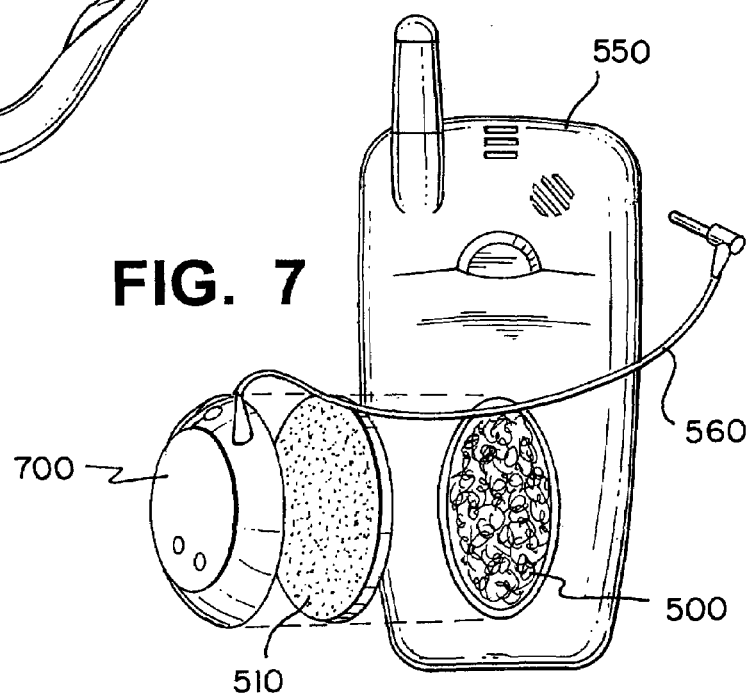
FIG. 7 is a perspective view of a transceiver usable with certain cellular telephones to communicate with the communication headset of FIG. 1.

FIG. 7 illustrates a transceiver 700 that can be used with a conventional cellular telephone 550 to enable wireless communication with the headset 100. The transceiver 700 can be secured to the telephone in any conventional manner, such as by hook and loop fastener portions 500, 510. A plug 560 engages a conventional headset jack on the telephone and conveys communication signals (and preferably also control signals such as answer, hang up, and voice commands) to the transceiver via wires. The transceiver includes circuitry that complements the headset 100, such as Bluetooth® circuitry for wireless communication therebetween.

For Bluetooth® enabled cellular phones, the communications headset 100 has an operative range of up to about 10 meters (33 feet). As a result, headset 100 can be used with a cellular phone that is held in a user's hand, kept in a user's clothing, purse or bag, or that remains across a room during use or operation. Calls can be received and initiated by the press of a button 120 on the communications headset 100 itself. In addition, volume and mute controls 122, 124 can be provided on the headset 100. Using conventional voice activation/speech recognition technology and software, numbers can be dialed in response to commands spoken into the headset microphone 170.

Figure 3:
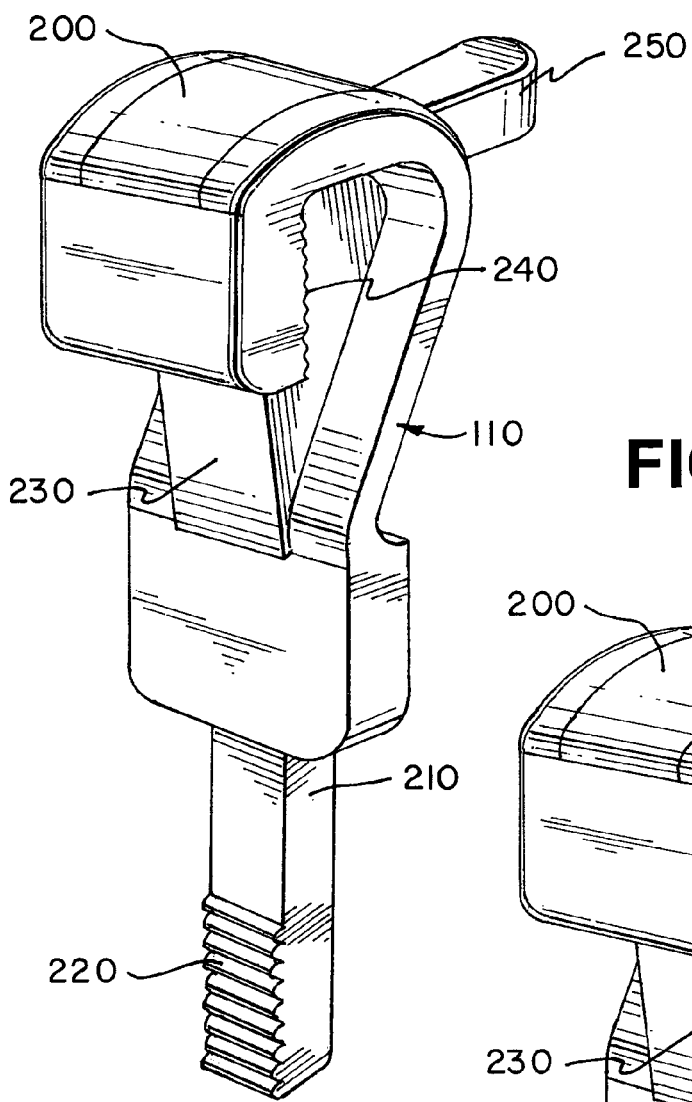
FIG. 3a is an exploded view of a first embodiment of the eyeglass attachment shown in FIG. 1.
FIG. 3b is an exploded view of a second embodiment of the eyeglass attachment shown in FIG. 1.
Figure 3:
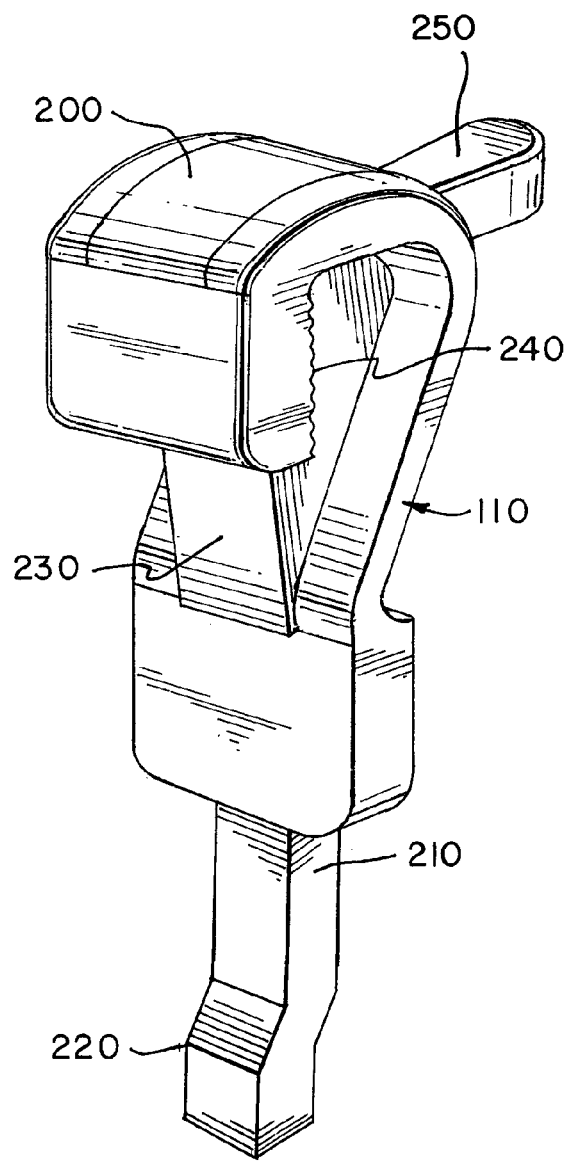

The communications headset 100 has a plurality of modes of supporting the headset in close proximity to a user's ear 140 and mouth 145 via exchangeable attachments. A first attachment (shown in FIGS. 1 and 3) is adapted to attach to a pair of glasses 118 worn by the user 150. The glasses may be sunglasses, protective glasses or standard prescription eyewear. In either case, the glasses have a frame (shown generally as 118), a pair of lenses 125 and a temple member 130 that secures the glasses around the user's ear 140.

According to one aspect of the invention shown in FIG. 3a, the first attachment has a top portion 200 that secures the first attachment 110 to the temple member of the glasses 130, and preferably at a back portion of the temple member 130 in close proximity to the user's ear 140. In this way, the user 150 can hear the other conversant's voice through the headset speaker 190 while the user's voice can still be received by the headset microphone 170. However, the first attachment 110 may be attached to any portion of the user's glasses 118.

The first attachment 110 is preferably made of a molded plastic but may be constructed in other ways and from other materials. The top portion 200 is configured to secure the attachment 110 to the user's glasses 130. A bottom portion 210, 220 is configured to secure the attachment 110 to the headset housing 180. According to one aspect of the invention, the top potion 200 is sized and shaped to fit over and around the temple member of the glasses 130 and, in a preferred embodiment, has a serrated face 240 to securely engage the glass frames 130. The serrated face 240 may be coated with a material such as rubber so as not to damage the glasses 130.

Preferably, the top portion 200 also has a cooperating mechanism 230, 250 that cooperates with the serrated face 240 so as to move the attachment 110 between an open position in which the attachment 110 can be placed on or removed from the user's frames 130 and a closed position in which the attachment 110 is secured to the frames 130 so as to prevent movement along the frame.

In the illustrated embodiment, the cooperating mechanism is a biased wall 230 which, in its rest state, remains in close proximity to, and more preferably abuts the serrated face 240. The wall can be urged against the restoring force of the bias (e.g., a leaf spring) in a direction away from the serrated face 240 by a user pulling on a lever 250. The lever 250 and wall 230 can comprise a unitary assembly. Thus, for example, the lever and wall can be made of rubber, which is shaped to have the wall 230 in close proximity to the serrated face 240 and the lever 250 extending outwardly through the top portion 200 so that it can be grasped by a user.

In the rest state, the wall 230 is in close proximity to the serrated face 240 so that it secures the glass fames 130. However, when the lever 250 is pulled back away from the serrated face 240 by the user, the wall 230 is urged away from the serrated face 240 against the natural resiliency of those unitary rubber components such that the attachment 110 can be placed on or removed from the frames 130. The cooperating mechanism can also comprise a clip that is normally biased to a closed position.

The first attachment 110 also has a bottom portion 210, 220 for securing the attachment to the headset housing 180. In a preferred embodiment, the bottom portion 210, 220 is shaped in the form of a downwardly dependent leg that is sized and shaped for receipt in a slot 410 in the mount 400 of the housing 180 (see FIGS. 5 and 6). In one embodiment, the bottom portion 210, 220 is sized to fictionally fit within the slot 410 to secure the first attachment 110 against motion within the slot 410. In the embodiment shown in FIG. 3a, the bottom portion 210, 220 includes one or more protuberances (such as a serration or series of bumps) 220 which cooperate with one or more constrictions in the slot 410 so as to secure the first attachment 110 against motion within the slot 410. In this embodiment, the protuberances 220 are sized and shaped such that when a protuberance 220 is introduced into the slot 410 and urged past any constrictions in the slot 410, each constriction individually secures the first attachment 110 from separation from the headset housing 180. In a further embodiment, the slot 410 has constrictions at each of its ends such that the first attachment 110 can be inserted into either side of the mount 400 and the headset 100 can be positioned for use with either of a user's ears 140. In a second embodiment shown in FIG. 3b, the bottom portion 210, 220 includes an upper half and a lower half that is transposed slightly in relation to the upper half. In this embodiment, the receiving slot 410 is shaped such that when the bent lower portion 210, 220 is introduced into the slot 410, the first attachment 110 is secured from moving by means of friction within the slot 410. In a further embodiment, the slot 410 includes a series of bends or constructions so as to further cause friction with bent lower portion 210, 220 and to prevent movement of the first attachment 110 within the slot 410.

Figure 2:
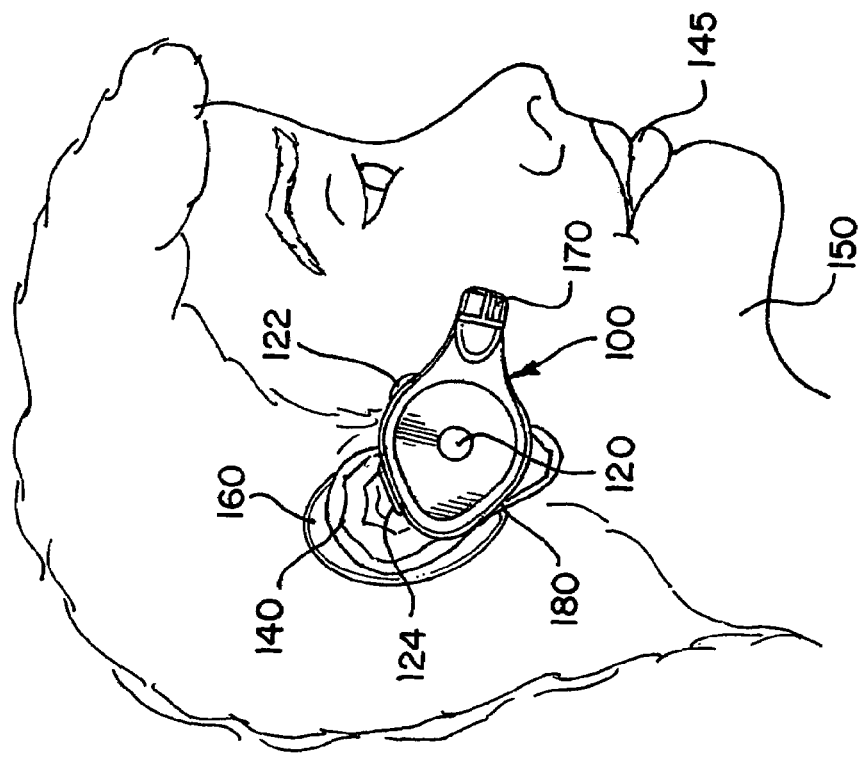
FIG. 2 is a side plan view of the communication headset of FIG. 1 and shown with an attachment configured to seat itself about an ear of a user.

A second attachment 160 for securing the headset 100 in close proximity to a user's mouth 145 and ear 140 is illustrated in FIGS. 2 and 4. The second attachment 160 has a top portion 300 for securing the attachment around a user's ear 140. Preferably, top portion 300 is sized and shaped to quickly, easily, and comfortably loop around and seat itself around either of a user's ears 140. The second attachment 160 also has a bottom portion 310, 320 for securing the second attachment 160 to the mount 400 on the headset housing 180.

Preferably, the bottom portion 310, 320 is shaped in the form of a downwardly dependent leg that is sized and shaped for receipt in either end of the slot 410. The bottom portion 310, 320 is preferably sized to frictionally fit within the slot 410 to secure the second attachment 160 against motion within the slot 410. According to one embodiment shown in FIG. 4a, the bottom portion 310, 320 includes one or more protuberances 320 which cooperate with one or more similarly shaped constrictions in the slot 410 so as to secure the second attachment 160 against motion within the slot 410. According to another embodiment shown in FIG. 4b, the bottom portion 310, 320 includes an upper half and a lower half that is transposed slightly in relation to the upper half. In this embodiment, the receiving slot 410 is shaped such that when the bent lower portion 310, 320 is introduced into the slot 410, the second attachment 110 is secured from moving by means of friction within the slot 410. In a further embodiment, the slot 410 includes a series of bends or constructions so as to further cause friction with bent lower portion 210, 220 and to prevent movement of the first attachment 110 within the slot 410.

As shown in FIG. 5, according to one aspect of the invention, a user quickly and easily attaches the bottom portion 210, 220 of the first attachment 110 to the headset housing 180 by inserting the first attachment 110 into either end of the slot 410 (as indicated by arrow 230). The position of the headset 100 relative to the user's ear 140 and mouth 145 can be adjusted by moving (as indicated by arrows 235) the bottom portion 210, 220 within the slot 410.

Figure 6:
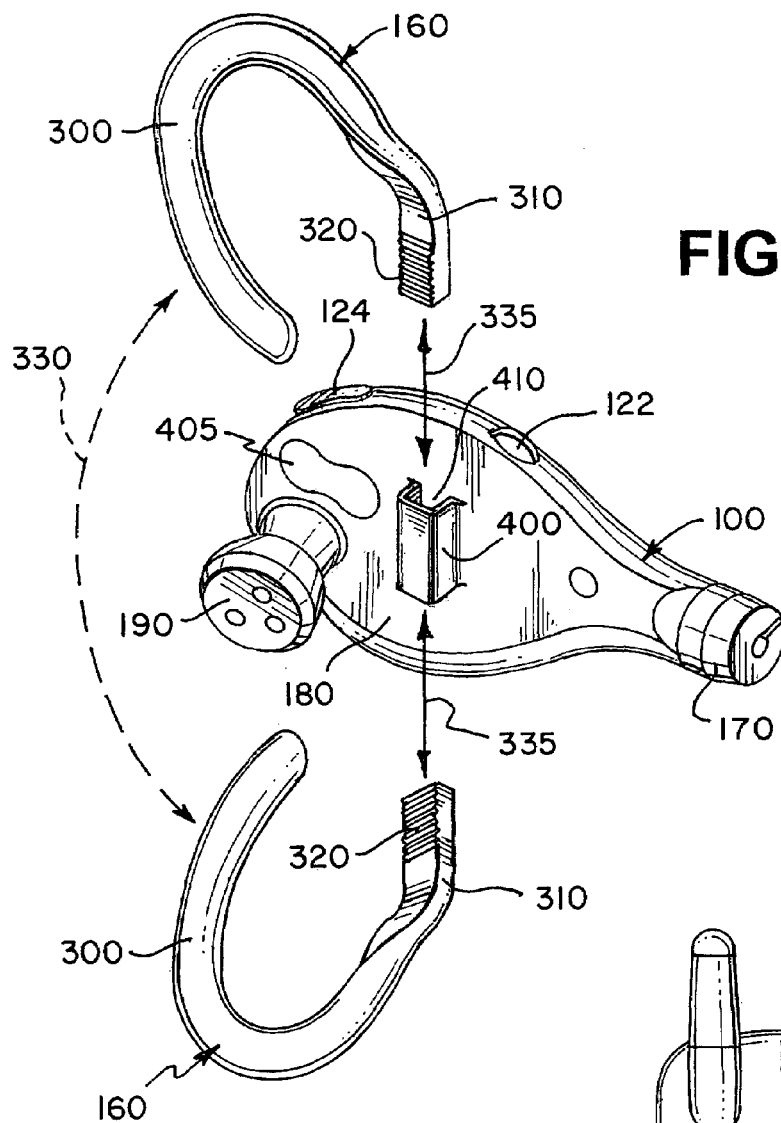
FIG. 6 is a side view illustrating a slot mount according to one aspect of the invention having the ear lobe attachment shown in FIGS. 2 and 4.

The use of the second attachment 160 is similar to that of the first attachment 110 and is further illustrated in FIG. 6. The second attachment 160 quickly and easily secures the bottom portion 310, 320 to the headset housing 180 by inserting the second attachment 160 into either end of the slot 410 (as indicated by arrows 330). The position of the headset 100 relative to the user's ear 140 and mouth 145 can be adjusted by moving (as indicated by arrows 335) the bottom portion 310, 320 within the slot 410.

While the mount 400 has been illustrated and described as including a slot 410 therein for receiving a leg of the first or second attachment devices 110, 160, according to another aspect of the invention, the mount is defined by a post having a free end extending from the housing 180 of the communication headset 100 about which the first and second attachment devices are secured, e.g., via a sleeve. These arrangements are interchangeable.

Figure 8:
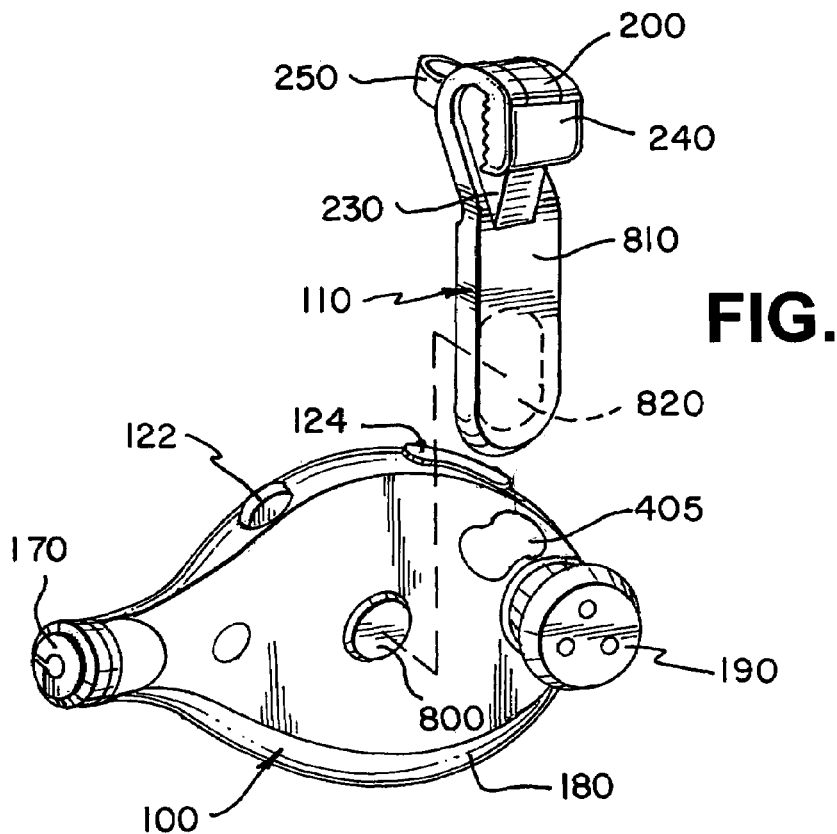
FIG. 8 is a side view illustrating a magnetic mount for the eyeglass attachment.
Figure 9:
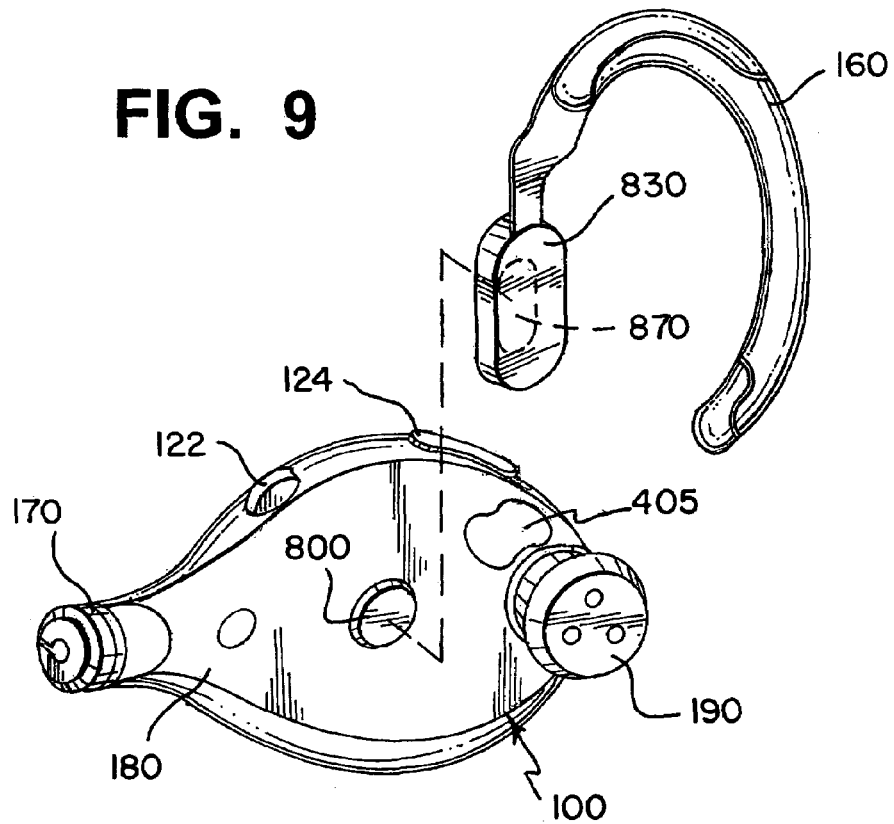
FIG. 9 is a side view illustrating the magnetic mount for the ear lobe attachment.

According to yet another aspect of the invention illustrated in FIGS. 8 and 9, the first and second attachment mechanisms 110, 160 include a top portion 200-250, 300 as discussed above in connection with FIGS. 1-4, and include a modified bottom portion 810, 830 for securing the attachment to the housing 180. Preferably, housing 180 includes a magnet 800 affixed to the housing. The magnet 800 can protrude from the internal part of the headset, piercing through the housing shell, or can be permanently affixed to the housing such as by using permanent glue, and is preferably seated so as to be shielded from circuitry within the communications headset 100.

The modified bottom portions 810, 830 include a metal or magnetically permeable component for securing the attachments 110, 160 to the magnet 800. In this way, a user can secure and remove the attachments 110, 160 from the magnet 800 whenever desired. Alternatively, magnets 820, 840 are affixed to the lower portions of the attachments 110, 160, and the housing 180 instead includes a metal or magnetically permeable component for securement with the magnets 820, 840.

Figure 10:
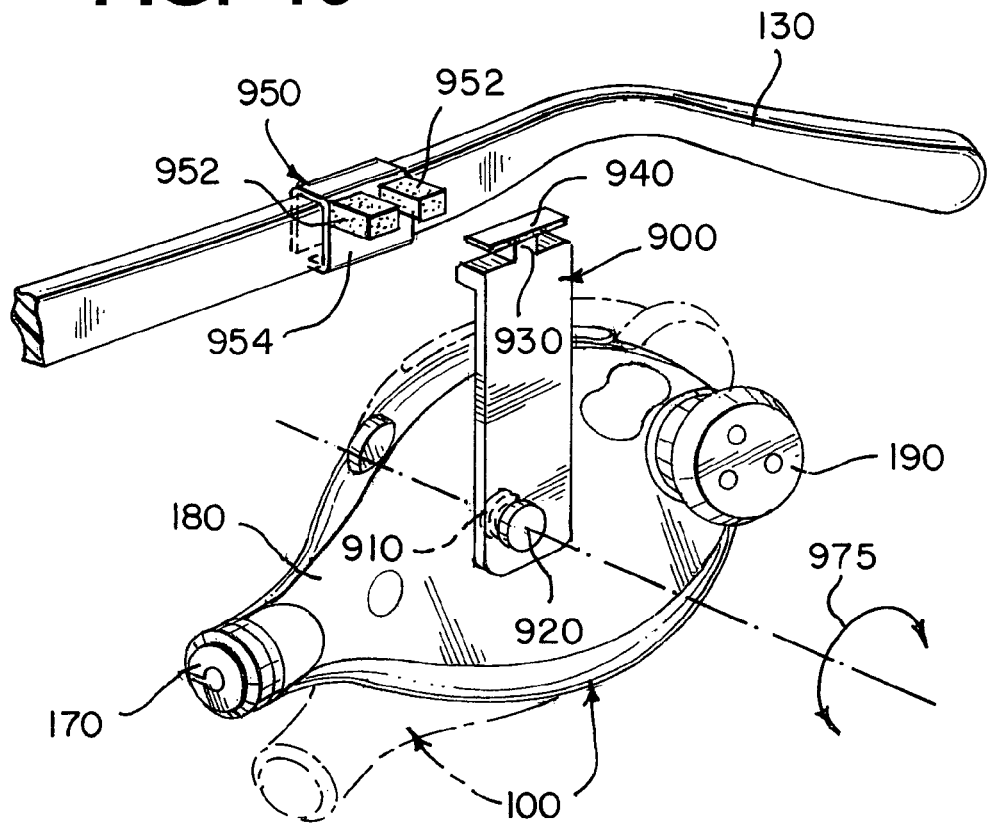
FIG. 10 is a side view illustrating a communications headset in accordance with an arrangement having an eyeglass attachment with a magnet that secures the attachment to a pair of eyeglasses.
Figure 10:
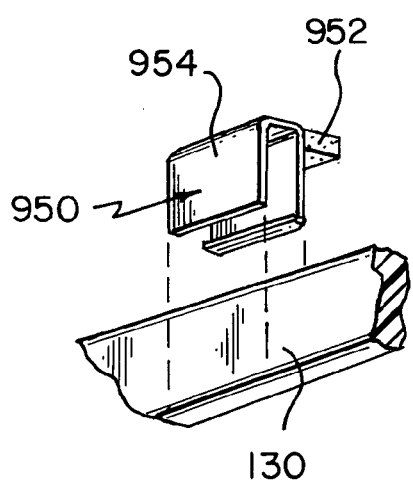
Figure 11:
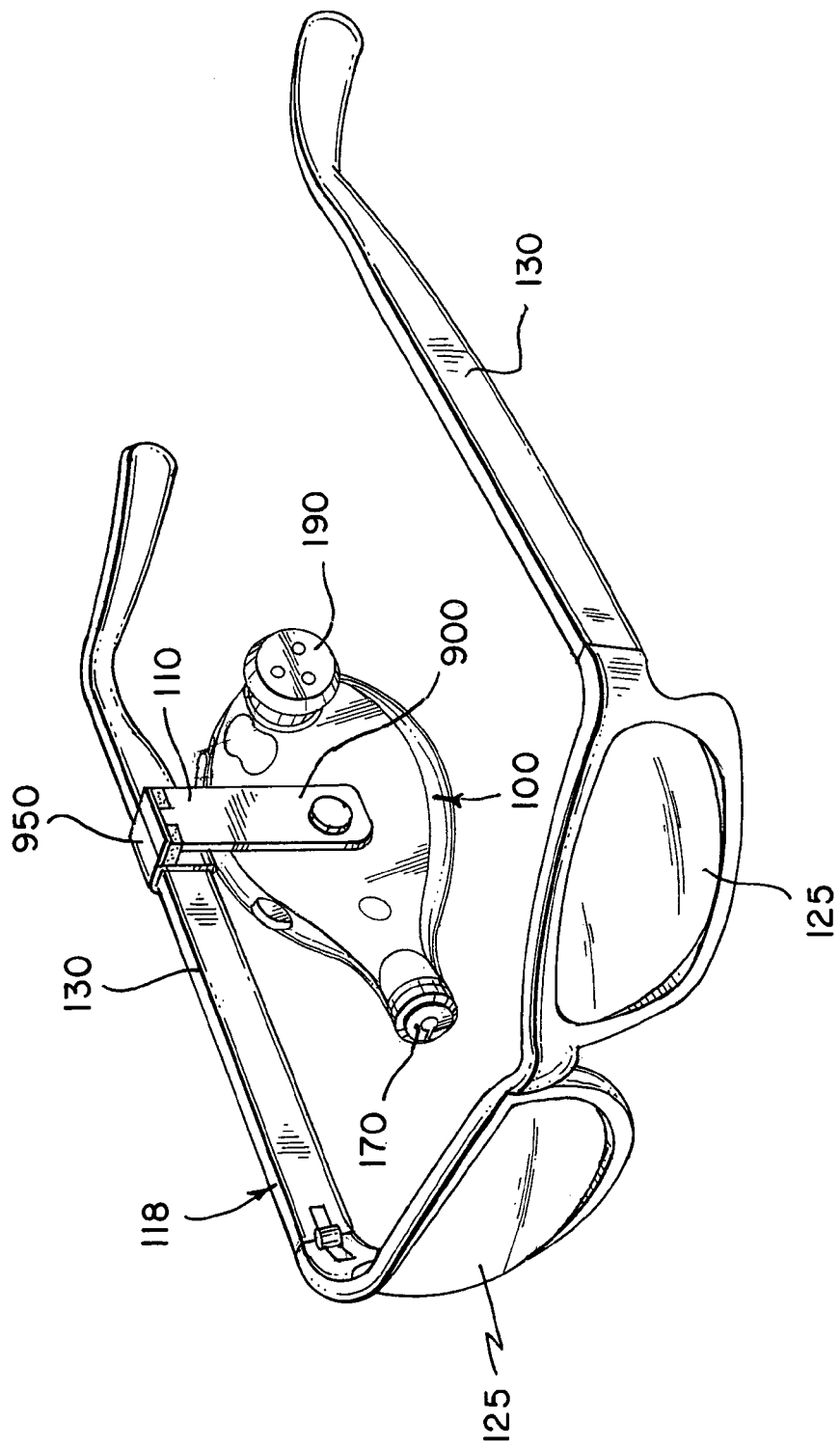
FIG. 11 is a side plan view illustrating the communications headset of FIG. 10 in securement with a pair of eyeglasses.

FIGS. 10 and 11 illustrate an arrangement in which the attachment includes two components—an eyeglass attachment component 950 and a housing attachment component 900. The housing attachment component is affixed at its lower end to the housing 180 at an attachment point 910. The housing attachment component may be affixed to the housing 180 in a variety of known ways, such as by molding the housing and the housing attachment component as a single piece. Preferably, however, the housing attachment component is hingedly connected to the attachment point 910 using a hinging mechanism 920. In this way, the headset 100 can rotate (shown as arrow 975) around the attachment point 910 to allow a user to adjust the location of the microphone 170 and the speaker 190 relative to the user's ear 140 and mouth 145.

Preferably, the housing attachment mechanism comprises an extension piece (shown generally as 900) that extends between a lower end proximate the hinge 920 and an upper top plate 940. The length of the extension is selected so as to allow the communication headset 100 to remain at a preselected height relative to the user's ear 140 and mouth 145 during use when connected to the eyeglass frames 130. Preferably, the housing attachment mechanism terminates at its top end 940 in a top plate that is joined to the extension piece by a bridge 930. The top plate 940 and the bridge 930 secure the headset 100 to a magnet (discussed below) provided on the eyeglass frames 130. The extension piece is preferably sized and shaped to be received within a correspondingly sized and shaped magnet portion 952 provided on the glass frames 130. Alternatively, the housing attachment component includes a magnet at its top end 940 that instead receives and secures a metal piece provided on the eyeglass frames 130.

The eyeglass attachment component 950 includes a receiving portion 954 for receiving the eyeglass frames 130. The receiving portion 954 is preferably sized and shaped to snugly fit over and around the frames 130. Alternatively, the receiving portion 954 may be permanently affixed to the frames 130. According to one aspect of the invention, the eyeglass attachment component 950 includes a magnet portion 952 that secures the housing attachment mechanism to the frames 130. Preferably, the magnet portion 960 is sized and shaped to cooperatively receive and hold the bridge and the top plate 930, 940 of the extension piece at the top of the housing attachment mechanism. Alternatively, eyeglass attachment component 950 includes a metal or magnetically permeable portion for securement with a magnet portion at the top of the housing attachment mechanism. The connection of head-set 100 to a pair of eyeglass frames using the eyeglass attachment component 950 and the housing attachment component 900 is shown in FIG. 11.

While the invention has been described in connection with certain preferred embodiments thereof it is not limited to such embodiments but rather is defined by the scope of the claims appended hereto.

The invention claimed is:

1. A wireless communications kit for use with a cellular telephone, comprising:
   a communications headset having a mount;
   a housing attached to the mount, the housing including a microphone, a speaker, a rechargeable battery and communications circuitry therein, the microphone and speaker being in communication with the cellular telephone, the communications circuitry having the microphone as an input and the speaker as an output;
   wherein the mount comprises a slot through the housing and wherein the slot includes a series of constrictions;
   a first attachment shaped to secure itself to the mount and configured to seat itself about an ear of a user; and
   a second attachment shaped to secure itself to the mount and including a top portion arranged to attach to a temple member of a pair of glasses,
   wherein the first and second attachments include a downwardly dependent leg shaped and sized for receipt in the slot and wherein the leg includes a protuberance, the protuberance being urged past the series of constrictions upon insertion and withdrawal of the leg and wherein each constriction individually secures the attachment from separation from the housing of the communication headset.

2. The wireless communications kit of claim 1, wherein the leg is frictionally fit within the slot.

3. The wireless communications kit of claim 1, wherein the leg includes an upper portion and a lower portion slightly transposed from the upper portion.

4. The wireless communications kit of claim 1, wherein the leg includes a series of protuberances.

5. The wireless communications kit of claim 1, wherein the mount includes a magnet secured to the housing.

6. The wireless communications kit of claim 5, wherein the first and second attachments include a magnetically permeable mount portion shaped to be seatable on the mount.

7. The wireless communications kit of claim 1, wherein the mount comprises a post having a free end extending from the housing of the communication headset.

8. The wireless communications kit of claim 7, wherein the first and second attachments include a downwardly dependent leg shaped and sized for receipt about the post so as to secure the leg to the post.

9. The wireless communications kit of claim 8, wherein the leg is frictionally fit about the post.

10. The wireless communications kit of claim 8, wherein the post includes an inner channel having a bent portion for receiving the leg.

11. The wireless communications kit of claim 1 further comprising a transceiver connectable to a communications jack on the cellular telephone by wires, the communications circuitry within the communications headset communicating in a wireless manner with the transceiver.

12. The wireless communications kit of claim 11, further comprising a fastener on each of the transceiver and the cellular telephone that secures the transceiver and the cellular telephone together.

13. A wireless communications kit for use with a cellular telephone, comprising:
   a communications headset having a mount;
   a housing attached to the mount, the housing including a microphone, a speaker, a rechargeable battery and communications circuitry therein, the microphone and speaker being in communication with the cellular telephone, the communications circuitry having the microphone as an input and the speaker as an output;
   wherein the mount comprises a post having a free end extending from the housing of the communication headset;
   a first attachment shaped to secure itself to the mount and configured to seat itself about an ear of a user; and
   a second attachment shaped to secure itself to the mount and including a top portion arranged to attach to a temple member of a pair of glasses,
   wherein the first and second attachments include a downwardly dependent leg shaped and sized for receipt about the post so as to secure the leg to the post,
   wherein the post includes a series of protuberances and the leg includes a protuberance, the protuberance being urged past the series of protuberances upon placement of the leg about the post, and wherein each protuberance individually secures the attachment from separation from the housing of the communication headset.

* * * * *